(No Model.) 2 Sheets—Sheet 1.
J. R. McCARDELL, C. H. WEST & M. J. McDONALD.
RUNNING GEAR.

No. 485,875. Patented Nov. 8, 1892.

Witnesses:
Lucy B. Hills
J. H. Goldsborough

Inventors:
James R. McCardell
Charles H. West
Martin J. McDonald
By F. V. Lawthrop
Their Attorney

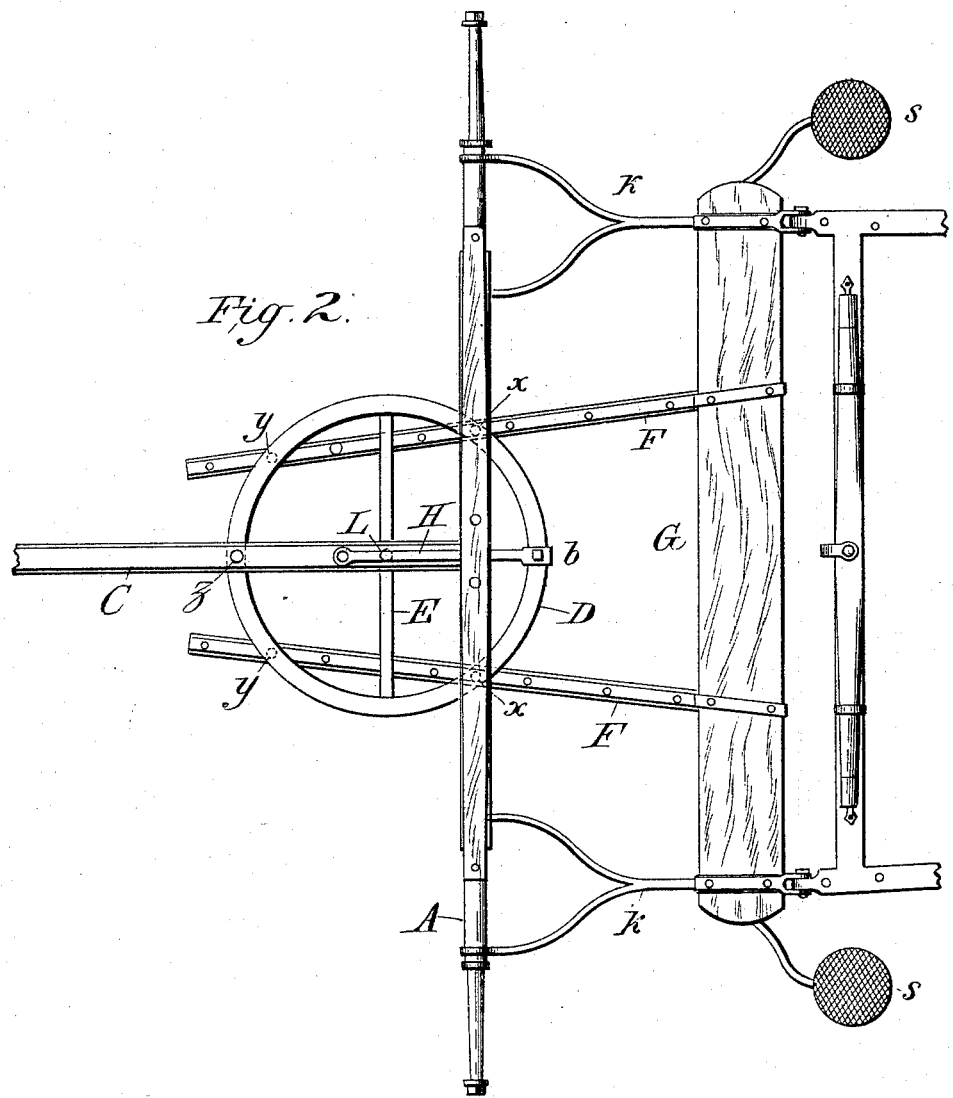

UNITED STATES PATENT OFFICE.

JAMES R. McCARDELL, CHARLES H. WEST, AND MARTIN J. McDONALD, OF TRENTON, NEW JERSEY.

RUNNING-GEAR.

SPECIFICATION forming part of Letters Patent No. 485,875, dated November 8, 1892.

Application filed March 30, 1892. Serial No. 427,309. (No model.)

*To all whom it may concern:*

Be it known that we, JAMES R. MCCARDELL, CHARLES H. WEST, and MARTIN J. MCDONALD, citizens of the United States, residing at Trenton, in the county of Mercer and State of New Jersey, have invented certain new and useful Improvements in Running-Gears of Wheeled Vehicles; and we do hereby declare the following to be a full, clear, and exact description of our said invention, such as will enable others skilled in the art to which it appertains to make and use the same.

Our invention relates to that part of the running-gear of wheeled vehicles in which provision is made for the turning of the front axle and wheels, by which the course of the vehicle is reversed or changed, and the support of the hounds, foot-board, and shafts; and it consists in the peculiar construction and combination of parts hereinafter described and claimed.

We shall now proceed to describe our said invention with reference to the accompanying drawings, in which—

Figure 1:
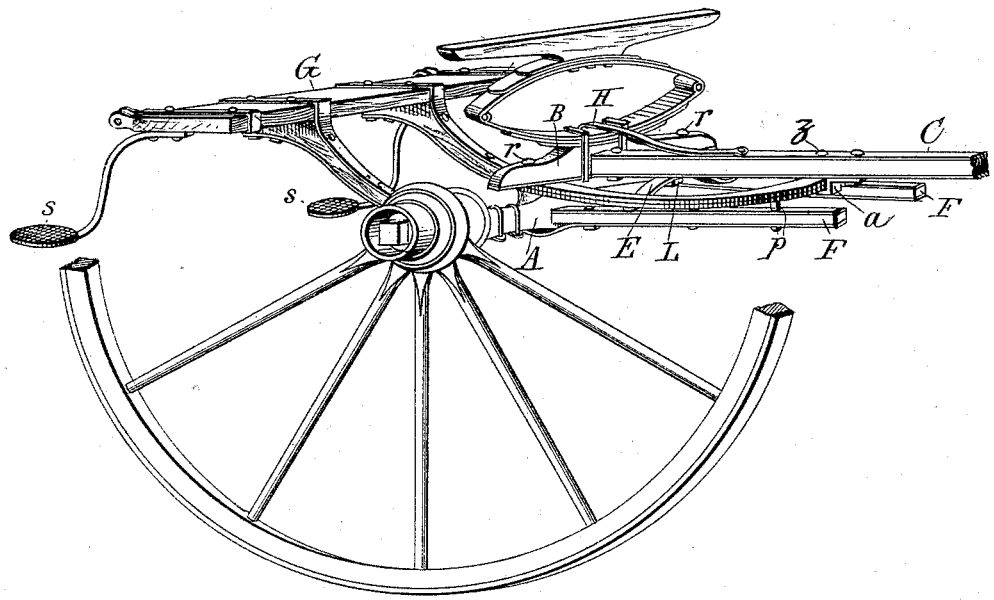

Figure 1 shows a perspective view of the forward part of the running-gear of a vehicle containing our invention; Fig. 2, a plan view of the same, and Fig. 3 a side view thereof.

In the drawings, A is the front axle, B the head-block; C, the reach or perch connecting the front and back axles of the vehicle; D, a fifth-wheel; E, the king-bolt brace of the fifth-wheel; F F, the hounds; G, the foot-board; H, the guard-brace; I, the lower hound-iron; K, the foot-board stay or step-braces, and L the king-bolt.

Figure 3:
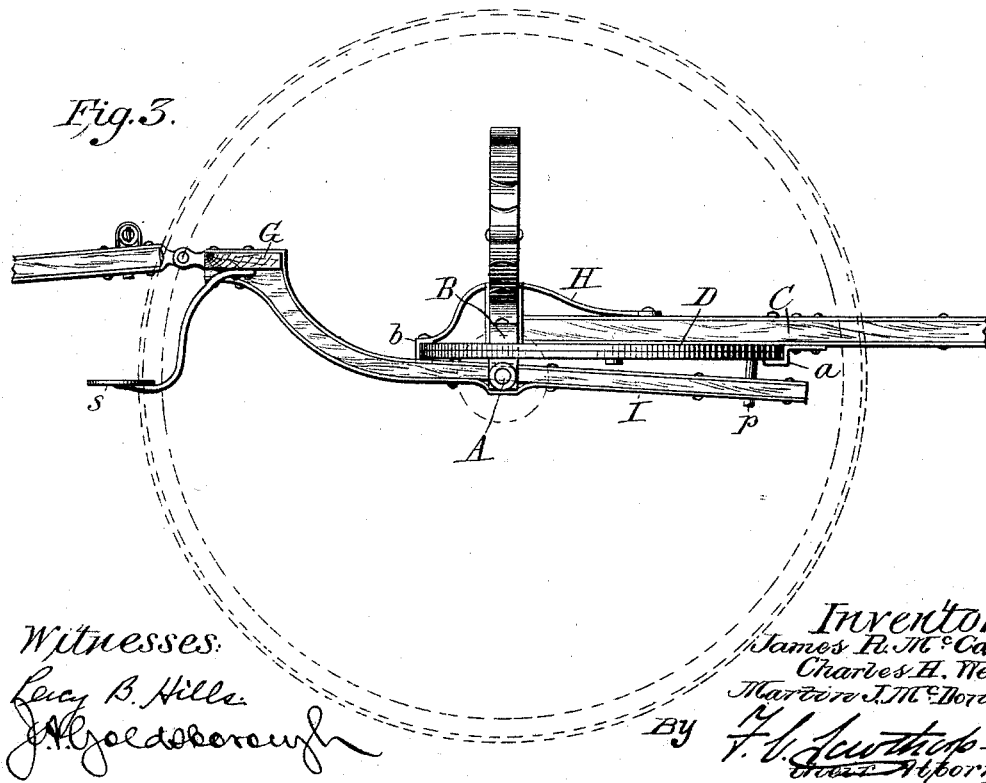

In applying our invention in the most advantageous manner to the running-gear of a vehicle we use a fifth-wheel D, composed of two entire circles of iron or steel faced to slide upon each other in the usual way and held together by two metal clips. (Shown at $a$ in Figs. 1 and 3 and at $b$ in Figs. 2 and 3.) This fifth-wheel is preferably so located that its major portion will be to the rear of the front axle. The lower section of the fifth-wheel is provided with four countersunk apertures to receive bolts, by which it is attached firmly to the front axle and the hounds, and the two holes, through which it is attached to the front axle A, being located at the points indicated by $x$ $x$ in Fig. 2, and the two holes, through which it is attached to the hounds F F, being located at the points indicated at $y$ $y$ in Fig. 2. The upper circle of the fifth-wheel is also provided with three countersunk apertures, one of which is at the point indicated by $z$ in the drawings, where the upper circle is attached firmly to the perch C by a bolt passing through it, the other two holes being located under the head-block B and near the ends thereof, at which points the upper circle of the fifth-wheel is rigidly attached to the head-block by bolts shown at $r$ $r$ in Fig. 1. The lower section of the fifth-wheel is provided with the cross-bar or king-bolt brace E, made integral with it, and the king-bolt L passes through the perch C and an annular opening in the middle of the brace E, thus permitting the lower circle or section of the fifth-wheel to turn on the king-bolt as a center. The hounds F F are made of iron or steel or of wood strengthened with metal strips or hound-irons, as shown in Fig. 3, and curve upwardly forward of the axle A, as shown in Fig. 3. The hounds are mortised through the axle A, as shown in Figs. 1 and 3, and are bolted to the lower section of the fifth-wheel at the points shown at $y$ $y$ in Fig. 2 and at $p$ in Figs. 1 and 3, and the bolts attaching the lower section of the fifth-wheel at $x$ $x$ in Fig. 2 pass through the hounds, thus making a rigid frame of the front axle, the hounds, and the lower section of the fifth-wheel. The connection of the upper section of the fifth-wheel with the perch C and the head-block B is preferably strengthened by the addition of the iron guard-brace H, which, as indicated in Fig. 3, passes from the upper side of the perch C at a point near the king-bolt L and over the head-block B and the spring mounted thereon to the forward clip of the fifth-wheel, which clip is made integral with the guard-brace. The foot-board G is firmly secured to the hounds by iron strips, and it is also attached to the axle A by the foot-board stays K K, to which are attached the steps $s$ $s$ and the shafts. By thus locating the fifth-wheel upon the axle A and rigidly connecting its lower section with the hounds and curving upwardly the front ends of the hounds, so as to elevate the foot-board and the shafts several advantages result. The steps from the ground to the wagon are made more nearly equal to each other than heretofore, and the weight of a person ascending to or descending from the vehicle is thrown entirely upon the running-gear, and not partly upon the horse, as heretofore, while the horse can be harnessed more closely to the vehicle than it can be with the ordinary straight hounds heretofore used. The fifth-wheel being placed only partially behind the axle A is relieved of much strain, which would fall upon it were it attached to the axle only at its periphery, while the king-bolt L being located at an appreciable distance to the rear of the front axle the vehicle can be made to turn in a small space, owing to the swinging of the wagon-body to the outside when the wagon is turned.

We are aware that our improved construction above described may be modified in various details without departing from the spirit of our invention—as, for instance, the advantage of the hounds with the upturned forward ends can be retained if the fifth-wheel be dispensed with and the rear ends of the hounds be joined by a sway-bar running beneath the perch; but such a combination would lack the advantage derived from locating the king-bolt so as to swivel in the guard-brace of the fifth-wheel instead of in the front axle, and would thus increase the radius of the curve in which the vehicle could turn. So, too, the fifth-wheel might be used in combination with straight hounds; but the advantage of close hitching would be lost. We do not therefore wish to be confined to the specific construction shown and described; but

What we claim as new, and desire to secure by Letters Patent, is—

1. In a running-gear for wheeled vehicles, the combination of the foot-board and the hounds, the latter having their front ends elevated above the axle and their rear ends extended behind the axle and rigidly connected, substantially as described.

2. In a running-gear for wheeled vehicles, the combination of the foot-board, the fifth-wheel, and the hounds, the latter having their front ends elevated above the axles and their rear ends extended behind the axle and rigidly connected to the fifth-wheel, substantially as described.

3. In the running-gear of a wheeled vehicle, the combination of the shafts, the axle, the hounds, and the fifth-wheel, the front ends of the hounds being elevated above the axle and the fifth-wheel being located so that its center is in rear of the axle, substantially as described.

4. The combination, in a running-gear for wheeled vehicles, of the shafts, the axle, the hounds, the foot-board, the fifth-wheel, the king-bolt, and the perch, the front ends of the hounds being raised above the axle and the rear ends being extended behind the axle and connected rigidly, substantially as described.

JAMES R. McCARDELL.
CHARLES H. WEST.
MARTIN J. McDONALD.

Witnesses:
SAMUEL D. OLIPHANT, Jr.,
F. C. LOWTHORP.